United States Patent [19]

Pretty

[11] Patent Number: 5,642,973
[45] Date of Patent: Jul. 1, 1997

[54] PLUMBING CLEANOUT COVER

[76] Inventor: Daniel Glenn Pretty, 10765 Okanagan Centre Road West, Okanagan Centre, British Columbia, Canada, V4V 2H8

[21] Appl. No.: 578,425

[22] Filed: Dec. 26, 1995

[51] Int. Cl.⁶ ................................................. F16B 37/14
[52] U.S. Cl. ........................ 411/431; 411/373; 411/377
[58] Field of Search ................................ 411/373, 377, 411/431, 512, 907, 908

[56] References Cited

U.S. PATENT DOCUMENTS

| | | |
|---|---|---|
| 3,548,704 | 12/1970 | Kutryk. |
| 3,620,257 | 11/1971 | Wright, Jr. .................... 138/89 |
| 4,360,041 | 11/1982 | Hagan et al.. |
| 4,571,136 | 2/1986 | Peek ........................ 411/512 X |
| 4,701,089 | 10/1987 | Nettel ........................... 411/373 |
| 4,850,778 | 7/1989 | Clough et al. ............. 411/512 X |
| 5,129,770 | 7/1992 | Coleman ........................ 411/373 |

*Primary Examiner*—Neil R. Wilson
*Attorney, Agent, or Firm*—Larson and Taylor

[57] ABSTRACT

A releasably mountable cleanout cover for releasable mounting onto a plumbing cleanout cap, having a protruding cap member, exposed within an aperture in a wall includes an aperture covering member having an exterior surface and an interior surface for covering the aperture in the wait, a hollow mounting tube rigidly mounted to and generally centered on, the interior surface and extending longitudinally and generally perpendicularly outwardly from the interior surface, a longitudinally spaced apart array of opposed inwardly extending resilient flanges spaced longitudinally apart within the hollow mounting tube for resilient deformation about opposed surfaces on the protruding cap member when the protruding cap member is snugly journalled in the hollow mounting tube so as to be snugly retained between the opposed inwardly extending resilient flanges.

7 Claims, 2 Drawing Sheets

PLUMBING CLEANOUT COVER

FIELD OF THE INVENTION

This invention relates to the field of plumbing access covers and, in particular, removable covers for plumbing access covers otherwise known as cleanouts through which a plumber may gain access into the plumbing in a residential home or the like via a cleanout accessible from the interior of the residence.

BACKGROUND OF THE INVENTION

Currently, in the construction of buildings, it is required by national and local plumbing codes that there be an easily accessible plumbing cover which, upon removal, allow a tradesman, such as a plumber, access to the interior of the plumbing in the building. The access covers are typically of black plastic, are functionally shaped to allow removal of the access cover, otherwise known as a "cleanout" and, thus, are not aesthetically appealing when viewed in the interior of the home. Quite often the cleanout will be accessible through a hole cut in the drywall on an interior wall of the building.

Consequently, there is a need, and it is an object of the present invention to provide, a simple aesthetically appealing cover which may be simply installed over an access cover to disguise its appearance, and which may be painted to match the colour of the wall and, yet, is adapted for quick and easy removal from the cleanout in the event that a tradesman needs to gain access to the cleanout.

Applicant is aware of U.S. Pat. No. 5,129,770 which issued to Coleman on Jul. 14, 1992 for an "Armadillo Tamper Resistant Bolt and Head Protector". The Coleman device concentrates on the specific provision of a tamper proof cover for cap screws. The Coleman design would not work is the application to which the present invention in directed as the intention of the Coleman device is to permanently mount a cover over a cap screw by means of gripping rings which penetrate the edges of the head or nut creating a permanent union of the cover and head or nut. In particular, a compression ring applies an upward force when the Coleman cover has been installed to force the gripping rings to penetrate the head or nut of a cap screw. Thus, it may be seen that the Coleman device is not a releasably mountable cover such as in the present invention and, in fact, the Coleman device teaches away from such a device.

SUMMARY OF THE INVENTION

It is an object of the present invention to provide an aesthetically appealing cover having a concave dome where the cover is removably mountable onto the plumbing access cover by means of a mounting tube depending from underneath the concave dome. The interior of the mounting tube is adapted to releasably mount onto the plumbing access cover and may extend outwardly from underneath the concave dome so that if the cleanout is recessed in behind a wall, the mounting tube will be long enough to releasably mount onto the recessed access cover leaving the aesthetically appealing dome covering the access aperture in the wall. In one embodiment of the mounting tube, the releasable mounting of the mounting tube onto the access cover is accomplished by resilient flanges extending inwardly of the mounting tube, so that as the dome and mounting tube are pressed down over the access cover so as to secure the dome flush against the wall, the mounting tube slides over the access cover to journal the access cover within the mounting tube thereby engaging and resiliently deforming the resilient flanges to hold the access cover in removable engagement therebetween.

The mounting tube may be of any cross-sectional shape so long as the inwardly extending resilient flanges engage and are resiliently deformed by the plumbing access cover. However, preferably, the mounting tube is circular or square in cross-section, depending on the corresponding shape of the access cover. The inwardly extending resilient flanges may, thus, extend inwardly around the interior circumference of the mounting tube. Preferably, there is a longitudinally spaced array of inwardly extending resilient flanges spaced along the longitudinal length of the mounting tube.

Advantageously, the mounting tube is adapted to be cut in cross-section or otherwise shortened so as to adjust its longitudinal length by cutting the mounting tube at longitudinally spaced apart notches or channels formed around the exterior circumference of the mounting tube.

In summary, a releasably mountable cleanout cover for releasable mounting onto a plumbing cleanout cap, having a smooth-sided protruding cap protruding therefrom, the protruding cap having opposed, smooth, generally vertical side surfaces, exposed within an aperture in a wall includes an aperture covering member having an exterior surface adapted to be painted or otherwise colourized and an interior surface for covering the aperture in the wall, a hollow mounting tube rigidly mounted to and generally centered on, the interior surface and extending longitudinally and generally perpendicularly outwardly from the interior surface, a longitudinally spaced apart array of opposed inwardly extending resilient flanges having inwardly disposed resilient bendable tips, the resilient flanges being spaced longitudinally apart within the hollow mounting tube for sliding resilient deformation over said opposed smooth, generally vertical side surfaces on the protruding cap when the protruding cap is translated in a first direction so as to be snugly journalled in the hollow mounting tube and thereby snugly retained between the opposed inwardly extending resilient flanges, and so as to resiliently bend said inwardly disposed resiliently bendable tips of said opposed inwardly extending resilient flanges in said first direction so as to engage said tips in flush frictional engagement with said opposed, smooth generally vertical side surfaces.

Advantageously, the aperture covering member is a dome and the hollow mounting tube extends longitudinally and generally perpendicularly outwardly from beneath the interior surface of the dome so as to extend generally perpendicularly outwardly from a first plane containing the edges of the dome. The opposed inwardly extending resilient flanges may be inclined longitudinally out of a plane parallel to the first plane in a direction towards the interior surface. The inclination may be approximately 30 degrees.

Preferably, the opposed inwardly extending resilient flanges are inwardly extending circumferential flanges extending around an interior circumference of the hollow mounting tube in a plane generally parallel to the first plane.

Further, advantageously, the hollow mounting tube has on its exterior surface a longitudinally spaced apart array of parallel grooves thereon interspersed generally between the longitudinally spaced apart array of opposed inwardly extending resilient flanges.

DETAILED DESCRIPTION OF THE PREFERRED EMBODIMENT

Figure 1:
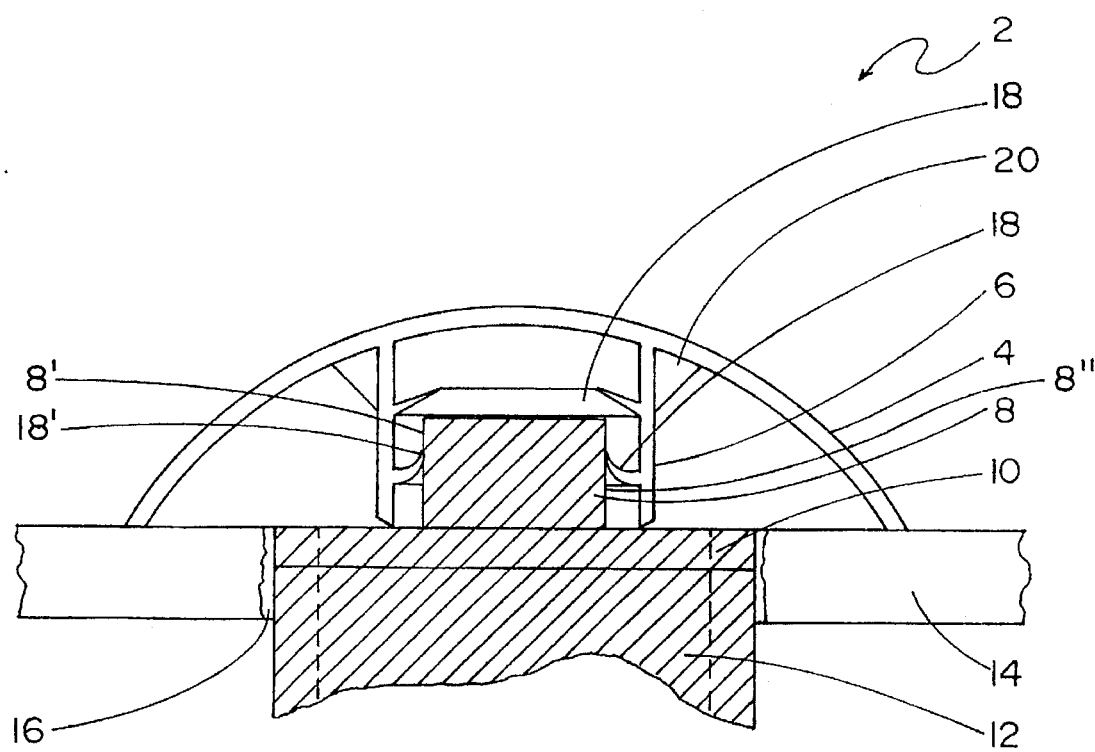
FIG. 1 is, in cross-sectional view, along line 1—1 in FIG. 3, an embodiment of the cleanout cover of the present invention releasably mounted onto a plumbing cleanout cover.

As illustrated in FIG. 1, cleanout cover 2 has concave dome 4 and mounting tube 6. Mounting tube 6 may be molded so as to form a unitary structure with concave dome 4 or may be securely and rigidly fastened or affixed to the concave interior of concave dome 4 so as to be centered within concave dome 4 and protrude downward from concave dome 4 in the orientation depicted in FIGS. 1 and 2.

Cleanout cover 2 is adapted for releasable mounting onto a plumbing access cover which has a cover plate 10 for releasable covering of plumbing cleanout 12, and a smooth-sided cap 8 protruding therefrom. As shown in the drawings, protruding cap 8 has opposed, smooth side surfaces 8', 8" which are generally perpendicular to cover cover plate 10. Conventionally, access cover cap 8 is square in cross-section so that a wrench or like tool may be applied to access cover cap 8 to thereby unscrew cover plate 10 from plumbing cleanout 12. Typically, access cover cap 8, cover plate 10 and plumbing cleanout 12 are of black ABS plastic. Typically, access cover cap 8 will protrude into the interior of a residence or the like through a hole or aperture 16 cut in interior wall 14. However, it is not necessarily the case that access cover cap 8 will protrude beyond the interior surface of interior wall 14. Often, plumbing cleanout 12 is recessed in behind aperture 16 in interior wall 14. In such cases, access cover cap 8 and cover plate 10 are consequently also recessed so that access cover cap 8 may be either flush with or recessed behind interior wall 14 in aperture 16.

Figure 2:
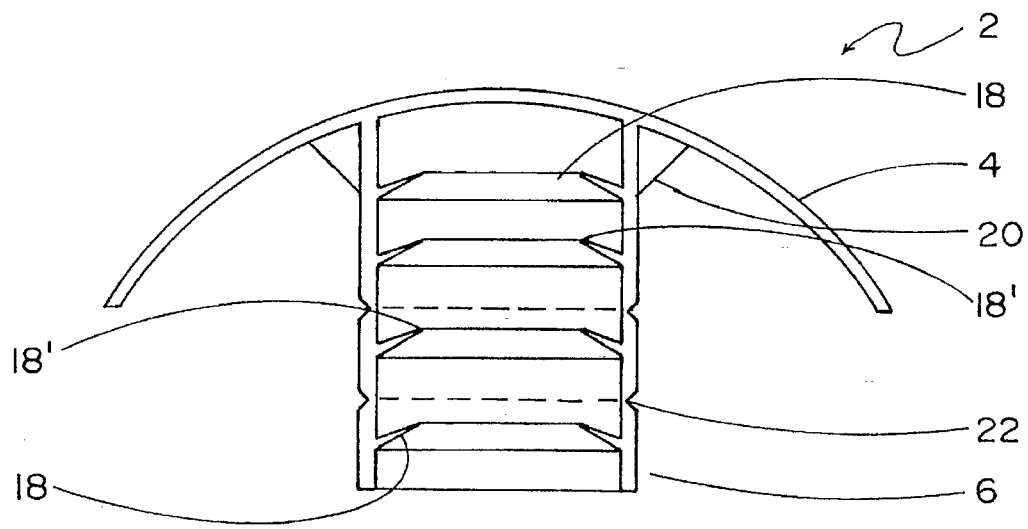
FIG. 2 is, in cross-sectional view, an alternative embodiment of the cleanout cover of the FIG. 1.

To provide for releasable mounting of the cleanout cover 2 of the present invention where access cover cap 8 is flush with or recessed behind interior wall 14 in aperture 16, the embodiment of the cleanout cover of the present invention illustrated in FIG. 2 may be employed. In this case, mounting tube 6 is extended longitudinally from concave dome 4 so that when concave dome 4 is mounted flush against interior wall 14 as depicted in FIG. 1, mounting tube 6 will extend into aperture 16 for releasable mounting onto access cover cap 8 in the manner illustrated in FIG. 1.

Figure 3:
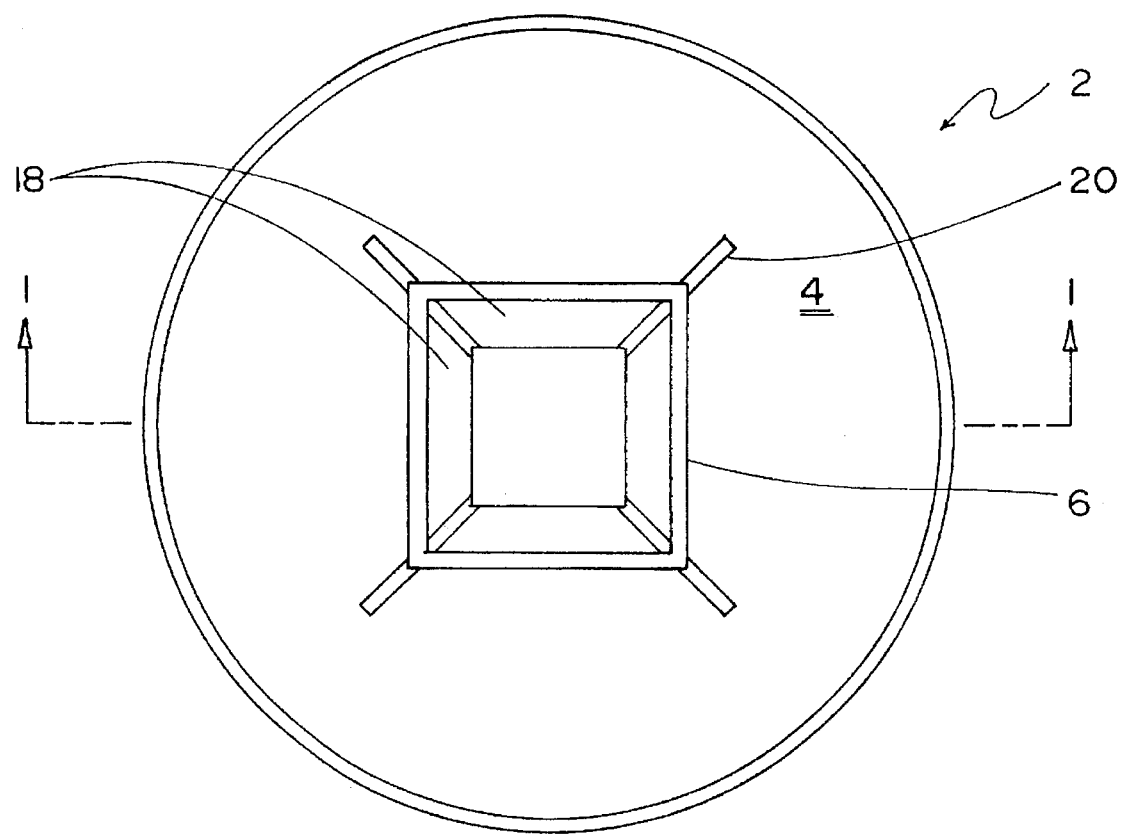
FIG. 3 is, in bottom plan view, the cleanout cover of FIG. 1.

In particular, releasable mounting of mounting tube 6 onto access cover cap 8 is accomplished by inwardly extending resilient flanges 18 having inwardly disposed resiliently bendable tips 18'. As depicted in FIG. 3, flanges 18 may extend around the interior circumference of mounting tube 6, where mounting tube 6 may be, as depicted, square in cross-section or may otherwise may have different shapes in cross-section, such as circular, so long as resilient flanges 18 can resiliently deform to slidably engage over the opposed sides of access cover cap 8. Cap 8 is snugly journalled in mounting tube 6 by being translated in a first direction (upwardly in the sense of FIGS. 1 and 2) relative to mounting tube 6 so as to resiliently bend tips 18' of flanges 18 in the first direction and so as to engage the tips in flush frictional engagement with the side surfaces of protruding cap 8.

Resilient flanges 18 may lie in a horizontal plane or may be upwardly inclined in their orientation as depicted in FIGS. 1 and 2 to assist retaining access cover cap 8 within mounting tube 6.

As also depicted in FIG. 2, mounting tube 6 may be supported by corner bracing members or fillets 20. Further, mounting tube 6 may have in longitudinally spaced array, interspersed between the longitudinally spaced array of resilient flanges 18, circumferential notches or grooves 22. Circumferential grooves 22 assist a user in guiding and easing the cutting of mounting tube 6 to the correct length so that the end of mounting tube 6 may be squarely cut off for flush mounting over access cover cap 8 onto the surface of cover plate 10.

Advantageously, concave dome 4 may also be a shallow concave dome so as to better camouflage the existence of cleanout 12. Concave dome 4 may have a textured outer surface or the like to assist in paint adhering thereto so as to further better camouflage concave dome 4 when installed on interior wall 14. In the situation where plumbing cleanout 12, cover plate 10 and access cover cap 8 are recessed behind or within aperture 16 in interior wall 14, concave dome 4 may approximate a flat plate whose outermost edges are formed to lie flush against interior wall 14 by a bevelled finish or the like.

Notwithstanding that the edges of concave dome 4 are flushly mounted against interior wall 14, cleanout cover 2 may be easily removed by inserting a thin edge of, for example, a knife or the head of a flat bladed screwdriver between the edge of concave dome 4 and interior wall 14 to thereby pry mounting tube 6 off access cover cap 8 against the resisting force of resiliently deformed resilient flanges 18 holding therebetween opposed edges of access cover protrusion 8.

The embodiment depicted in FIG. 1 to 3 would be releasably mountable onto a conventional 3" or 4" ABS plastic cleanout having an access cover protrusion 1.5" square, if the cleanout cover 2 had the following dimensions: 6¼" diameter concave dome 4, 2" square mounting tube 6, ¼" wide resilient flanges 18, 4" radius of curvature for concave dome 4 (i.e., a 1.5" dome height), 30 degree upward inclination from a horizontal plane for horizontal flanges 18, and ½" longitudinal spacing between resilient flanges 18 in longitudinal array along mounting tube 6.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A releasably mountable cleanout cover for releasable mounting onto a plumbing access cover exposed within an aperture in a wall, said plumbing access cover having a cover plate and having a smooth sided protruding cap protruding therefrom, said protruding cap having opposed, smooth, side surfaces extending generally perpendicular to said cover plate, said cover comprising:

an aperture covering member having an exterior surface, circumferential edges, and an interior surface for covering said aperture in said wall, a hollow mounting tube rigidly mounted to and generally centered on, said interior surface, said hollow mounting tube extending longitudinally and generally perpendicularly outwardly from said interior surface, a longitudinally spaced apart array of opposed inwardly extending resilient flanges having inwardly disposed resiliently bendable tips, said resilient flanges being spaced longitudinally apart within said hollow mounting tube for sliding resilient deformation over said opposed, smooth, side surfaces on said protruding cap when said protruding cap is translated in a first direction so as to be snugly journalled in said hollow mounting tube and thereby snugly retained between said opposed inwardly extending resilient flanges, and so as to resiliently bend said inwardly disposed resiliently bendable tips of said opposed inwardly extending resilient flanges in said first direction so as to engage said tips in flush frictional engagement with said opposed, smooth side surfaces.

2. The releasably mountable cleanout cover of claim 1 wherein said aperture covering member is a dome and said hollow mounting tube extends longitudinally and generally perpendicularly outwardly from beneath said interior surface of said dome so as to extend generally perpendicularly outwardly from a first plane containing said circumferential edges of said dome.

3. The releasably mountable cleanout cover of claim 2 wherein said opposed inwardly extending resilient flanges are inclined longitudinally out of a plane parallel to said first plane in a direction towards said interior surface.

4. The releasably mountable cleanout cover of claim 3 wherein said opposed inwardly extending resilient flanges are inclined upwardly in said first direction approximately 30 degrees.

5. The releasably mountable cleanout cover of claim 4 wherein said exterior surface of said aperture covering member is adapted to be colourized.

6. A releasably mountable cleanout cover for releasable mounting onto a plumbing cleanout cap exposed within an aperture wall said plumbing cleanout cap having a protruding cap member comprising:

an aperture covering member having an exterior surface, circumferential edges, and an interior surface for covering said aperture in said wall, a hollow mounting tube rigidly mounted to and generally centered on, said interior surface, said hollow mounting tube extending longitudinally and generally perpendicularly outwardly from said interior surface, a longitudinally spaced apart array of opposed inwardly extending resilient flanges spaced longitudinally apart within said hollow mounting tube for resilient deformation about opposed surfaces on said protruding cap member when said protruding cap member is snugly journalled in said hollow mounting tube so as to be snugly retained between said opposed inwardly extending resilient flanges, wherein said aperture covering member comprises a dome and said hollow mounting tube extends longitudinally and generally perpendicularly outwardly from beneath said interior surface of said dome so as to extend generally perpendicularly outwardly from a first plane containing said circumferential edges of said dome, and wherein said opposed inwardly extending resilient flanges are inwardly extending circumferential flanges extending around an interior circumference of said hollow mounting tube in a plane generally parallel to said first plane.

7. The releasably mountable cleanout cover of claim 6 wherein said hollow mounting tube has on its exterior surface a longitudinally spaced apart array of parallel grooves thereon, interspersed generally between said longitudinally spaced apart array of opposed inwardly extending resilient flanges.

* * * * *